United States Patent Office 2,784,608
Patented Mar. 12, 1957

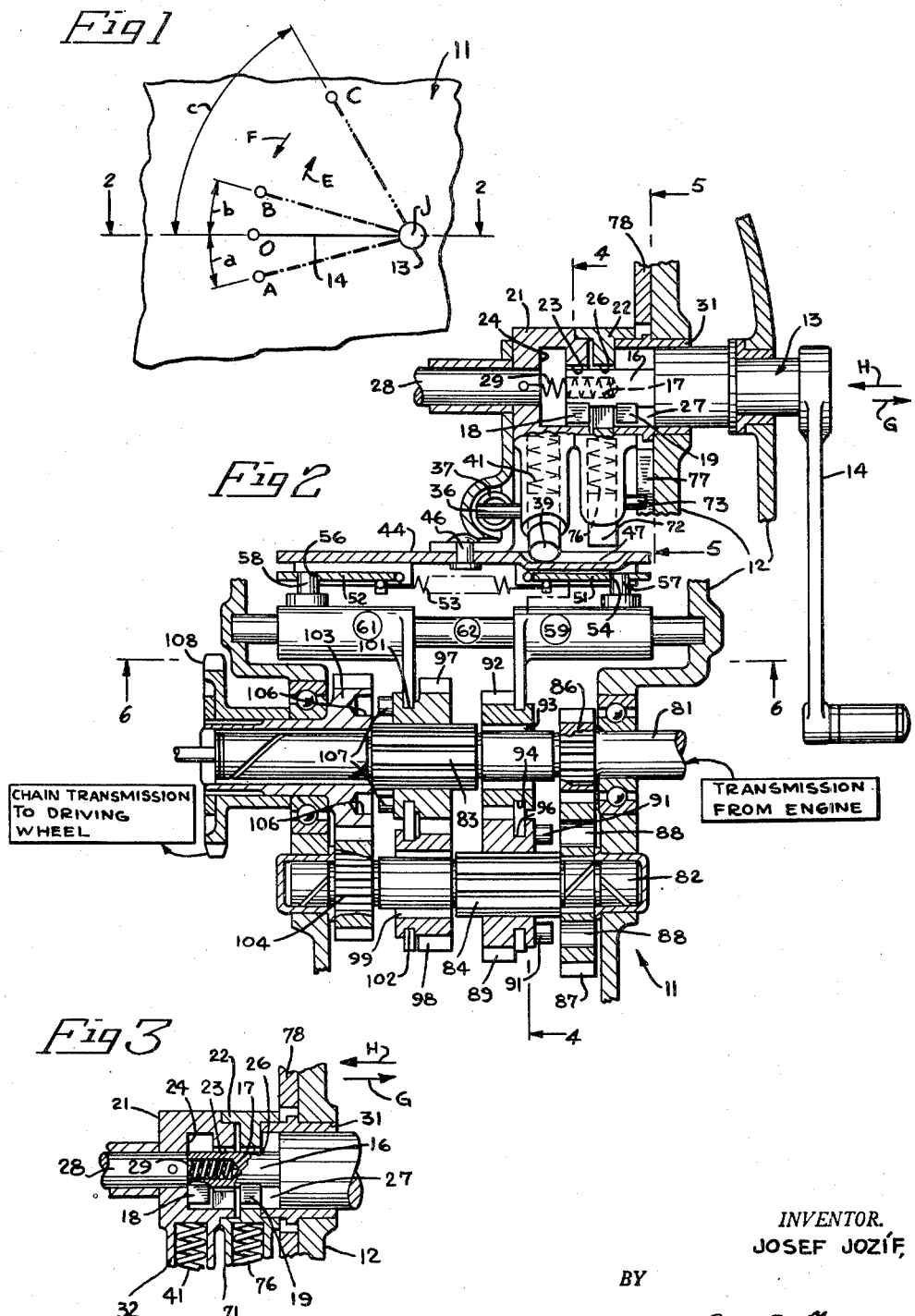

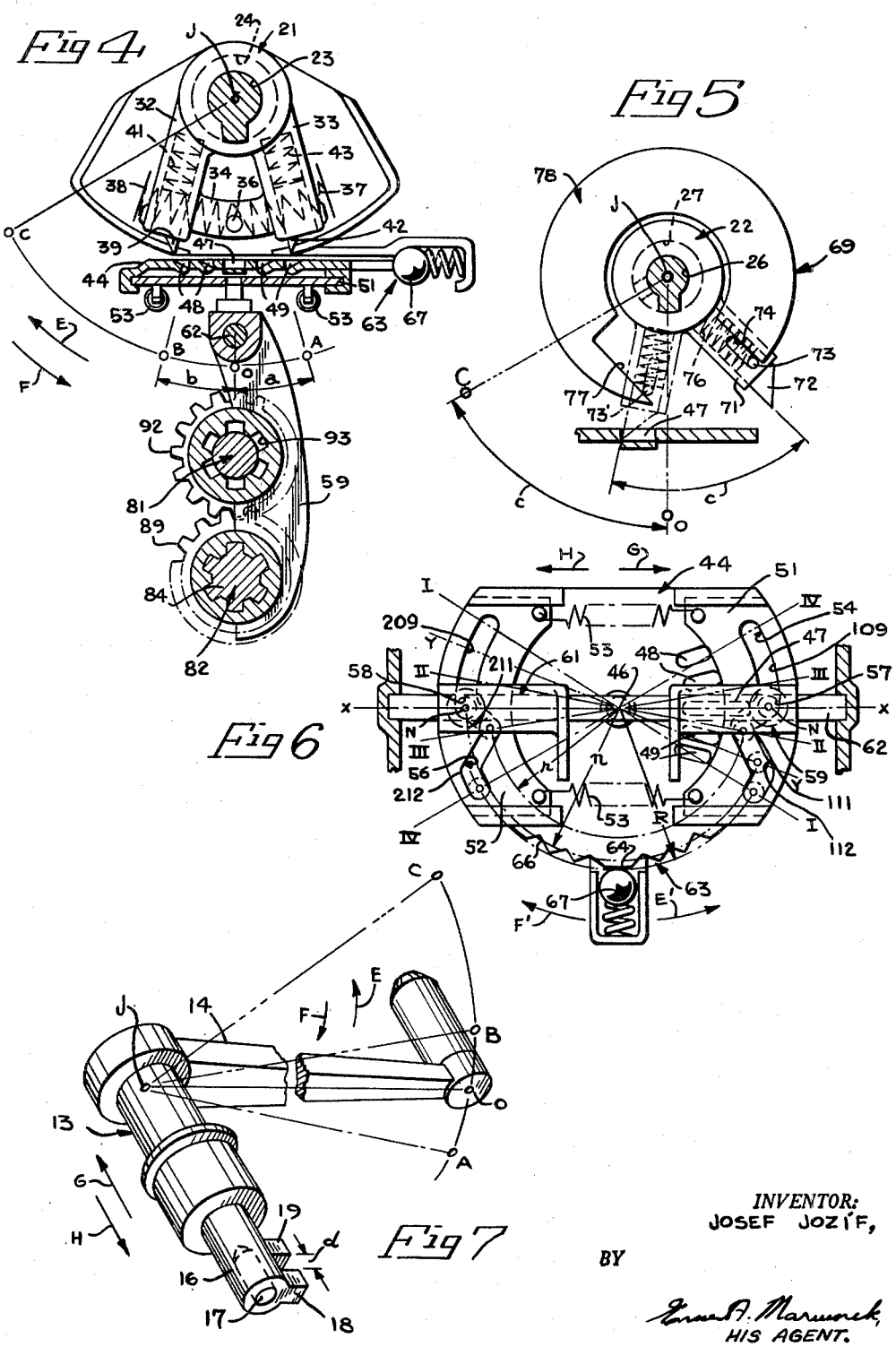

2,784,608

GEAR TRANSMISSION

Josef Jozif, Prague, Czechoslovakia

Application August 3, 1953, Serial No. 371,851

Claims priority, application Czechoslovakia September 17, 1952

8 Claims. (Cl. 74—337.5)

The invention relates to transmission mechanisms, and relates more particularly to gear transmissions especially suited for motorcycles. Still more particularly, the invention relates to gear transmissions of the type wherein gearing may be shifted among neutral and a plurality of active speed positions or stations by the manipulation of a single lever.

Desirable features for gear transmissions for motorcycles include compactness and simplicity of handling, and these features are usually found in motorcycle transmissions now in use. However, present transmissions of this type are deficient therein that shifting to neutral gear station may not be accomplished directly from a high speed station, but only step-wise from higher to lower speed stations and finally to neutral station.

This drawback makes itself particularly felt in city traffic where frequent shifting to neutral from various active gear speed stations is necessary for restarting after street intersection stops.

The invention has therefore among its objects to provide means for directly shifting from high speed stations to neutral station and the by-passing of the intervening speed stations.

It is further among the objects of the instant invention to provide for such by-pass by the shifting lever without any auxiliary levers, so that manipulation by means of one hand or one foot of all gear shifting can be carried out.

For a fuller understanding of the nature and objects of the invention, reference should be had to the following detailed description, taken in connection with the accompanying drawings, in which:

Fig. 1 is a schematic elevational view showing the exterior of a gear box and various positions of the gear shifting lever thereon, in accordance with the invention;

Fig. 2 is a large scale fragmentary horizontal sectional view taken on line 2—2 of Fig. 1, showing the lever in the normal outer position, and the gearing in neutral station;

Fig. 3 is a fragmentary sectional view showing a detail illustrated in Fig. 2, but wherein the shifting lever has been shifted inwardly from the position shown in Fig. 2;

Fig. 4 is a vertical fragmentary sectional view, partly in elevation, taken on line 4—4 of Fig. 2;

Fig. 5 is a vertical fragmentary sectional view, partly in elevation, taken on line 5—5 of Fig. 2;

Fig. 6 is an elevational view illustrating the underside of the turnable shift actuator plate, partly in section, taken on line 6—6 of Fig. 2; and Fig. 7 is a perspective view of the lever shown in Fig. 2, and indicating various positions thereof as shown in Fig. 1.

In carrying the invention into effect in one of the embodiments which has been selected for illustration in the accompanying drawings and for description in this specification, and referring now particularly to Fig. 1, there is provided a gear box generally indicated at 11 that has a housing or frame 12 in which there is revolubly journalled a shaft 13 that carries a lever 14. In addition to turning, the lever 14 and the shaft 13 may also be shifted in opposite directions H and G axially of the shaft 13 between a normal outer extreme position shown in Fig. 2 and a temporary inner extreme position shown in Fig. 3. In the outer position the lever 14 is operable for gear actuation and release, whereas in the inner position the lever 14 is operable for by-pass gear release, as will be explained later on.

As best shown in Fig. 7, the shaft 13 is provided on its inner end with a round shaft portion 16 that has a central bore 17 open inwardly of the gear box 11, and is provided with two integral keys 18 and 19. The keys 18 and 19 are in alignment axially of the axis of the shaft 13 and are spaced from each other for a distance "$d$".

Two driving members, namely an actuating member 21 and a by-pass release member 22, are journalled in the frame 12 for turning about the axis of the shaft 13. The actuating member 21 has a keyhole aperture 23 in which there fit the portion 16 and the key 18 in the outer position (Fig. 2) of the shaft 13. The actuating member 21 furthermore has adjacent to the keyhole aperture 23 a cylindrical chamber 24 in which, in the inner position (Fig. 3), the key 18 may idle when the shaft 13 is turned. Similarly, the release member 22 has a keyhole aperture 26 into which there fit the portion 16 of the shaft 13 and the key 19 when the shaft 13 is in the inner position (Fig. 3), and has adjacent thereto a cylindrical chamber 27 in which the key 19 may idle when the shaft 13 is in the outer position (Fig. 2). The thickness of the keyhole apertures 23 and 26 is slightly smaller than the distance "$d$" between the keys 18 and 19.

The actuating member 21 is journalled on a shaft 28, and a spring 29 abuts against the outer face of the shaft 28 and extends into the bore 17 of the portion 16 of the shaft 13, urging the shaft 13 in direction G (Fig. 2) into the normal outer extreme position shown in Fig. 2. The shaft 13 may be pressed by the operator in the direction H against the resilient force of the spring 29 into the inner position shown in Fig. 3.

The release member 22 is journalled partly on the actuating member 21 and partly on a bushing 31 that is located in the frame 12 and which surrounds the outer portion of the shaft 13 guiding the latter during shifting in directions H and G.

The actuating driving member 21, as best shown in Fig. 4, has two angularly offset arms 32 and 33 and a bridge 34 therebetween. A pin 36 extends from the bridge 34, and is engaged by two pressure springs 37 and 38 that are secured in the frame 12. The springs 37 and 38 urge the actuating member 21 to return to the normal zero position (shown in Fig. 4), in which the center of the pin 36 is positioned in a horizontal plane illustrated by a line J—O indicating the zero position of the lever 14 (Figs. 1 and 7).

The arm 32 has on its interior a reciprocably movable inwardly facing latch 39 that is resiliently pressed into a projected position by a spring 41, and similarly the arm 33 has a latch 42 that faces inwardly and opposite to the latch 39 and that is pressed into projected position by a spring 43.

The lever 14, during its engagement of the actuating driving member 21 (Fig 2) can be swung between the positions A and B (Figs. 1, 4 and 7) upwardly in direction E, as well as downwardly in direction F. During such movement, it will take along the actuating member 21 which will swing along therewith to the extent that the pin 36 will move in the sector between the planes J—A and J—B, as best shown in Fig. 4.

There is provided a gear shift actuator, for instance a platen generally indicated at 44 (Figs. 2, 4 and 6) that is rotatable about a pivot 46. This platen 44, as best shown in the underside view of Fig. 6, is provided on one longitudinal side with a central long groove 47, and with a plurality of short grooves 48 at one side of the groove 47 and with a plurality of short grooves 49 at the opposite side of the groove 47, two grooves 48 and 49 being shown in the drawings. The grooves 47, 48 and 49 are so arranged that the grooves 47 and 48 can be engaged by the latch 39, while the grooves 47 and 49 can be engaged by the latch 42.

On the underside of the platen 44 there are slideably arranged two link plates 51 and 52, and these are interconnected by two biasing springs 53. The springs 53 are so dimensioned that the link plates 51 and 52 during normal operation are strongly though resiliently held stationary in the position relative to the platen 44 illustrated in Fig. 6; however, the dimensioning of the springs 53 is such that they will yield, permitting the link plates to slide from the normal position shown in Fig. 6 during operation of the by-pass to neutral gear station, as will be referred to below.

Each of the link plates 51 and 52 has a cam slot, namely the link plate 51 having the cam slot 54, and the link plate 52 having the cam slot 56. A cam follower pin engages each cam slot to be guided thereby for gear shifting, namely a cam follower pin 57 engaging the slot 54 and a cam follower pin 58 engaging the slot 56. Each of the pins 57 and 58 is connected to a gear shift fork, namely the pin 57 being connected to a fork 59 shown on the righthand side in the drawings, and the pin 58 being connected to a fork 61 shown on the lefthand side in the drawings. Both forks 59 and 61 are slideably arranged on an arbor 62 that is secured in the frame 12.

As will be readily understood, turning of the platen 44 about the pivot 46 will result in movement of the pins 57 and 58 as guided by the cam slots 54 and 56; thereby, the forks 59 and 61 will be shifted accordingly on the arbor 62.

On the exterior of the platen 44, there is arranged a mechanism generally indicated at 63 for holding the platen 44 in any position to which it may have been turned about the pivot 46 by the actuating member 21. This mechanism 63 comprises a shaping along the circumference of the platen 44 which includes a flat portion 64 for the neutral position (shown in Fig. 6) in which, as will be shown later on, the gears are in neutral station, and a series of indentations 66 adjacent thereto for positions to which the platen 44 may be turned and which are different from the neutral position. A spring biased sphere 67 is arranged adjacent the circumference of the platen 44 to cooperate with the flat portion 64 and with the indentations 66, for latching the platen 44.

In the foregoing, there has been described the moving of the actuating driving member 21 to turn the platen 44 for shifting the forks 59 and 61; this is for the purpose, as will be explained later on, of shifting the gears of the gear box 11 between a neutral station and several, for instance four, different speed stations. The preceding mechanism is operated with the shaft 13 and the lever 14 in the outer extreme position shown in Fig. 2, wherein the shaft 13 is engaged with the driving member 21 for actuating the latter.

However, a by-pass mechanism is provided to return the platen 44 to its neutral position (Fig. 6) from most of the positions to which it may have been turned by the driving member 21, without, for such return movement, utilizing the actuating driving member 21. Instead, for such return, there may be used a by-pass mechanism, generally indicated at 69 (Fig. 5), which is operated in the inner position (Fig. 3) of the shaft 13 and lever 14, and this will now be described.

In the inner position, the key 19 engages the keyhole 26 of the release driving member 22. This release member 22, as best shown in Fig. 5, comprises an arm 71 in which there is slidably arranged a latch 72 which carries a pin 73 that protrudes through a slot 74 of the arm 71.

The pin 73 and the slot 74 define the extent of sliding movement of the latch 72 in the arm 71. The latch 72 is pressed by a spring 76 towards a normal projected position shown in Fig. 5. The arm 71 and latch 72 are positioned outwardly (to the right, Fig. 2) of the arms of the driving member 21, and thus the latch 72 is positioned to engage of all the grooves of the platen 44 only the long groove 47 at the outer extremity thereof.

When the lever 14 is in driving engagement with the actuating driving member 21 it moves through an arc defined by the positions J—A and J—B (Figs. 1, 4, and 7); correspondingly, the arm 32 moves through an arc "b" and the arm 33 through an arc "a" (Fig. 4). However, when the lever 14 engages the release driving member 22, it moves through an arc defined by the positions J—O and J—C (Figs. 1 and 5); correspondingly, the arm 71 moves during the latter movement through an arc "c" (Fig. 5). As best shown in Fig. 5, this movement of the arm 71 and the latch 72 will bring the groove 47 beyond the neutral position (Fig. 6, line J—O of Fig. 5). In that position the pin 73 will be engaged by the upwardly inclined surface 77 of a stationary member 78 that is secured on the frame 12, whereby the latch 72 will be retracted into the arm 71 against the pressure of the spring 76 and out of engagement with the groove 47.

Near the forks 59 and 61 there are journalled in the frame 12 two shafts, namely a main shaft 81 that is driven from the engine (not shown) of the motorcycle, and an auxiliary shaft 82. The main shaft 81 has a fluted section 83, and the auxiliary shaft 82 has a fluted section 84, and these fluted sections 83 and 84 are offset from each but overlap partially. On the main shaft 81 there is secured, for instance keyed, a gear 86 that meshes with a gear 87 that is freely turnable, but not shiftable, on the auxiliary shaft 82. The gear 87 is provided with a plurality of apertures 88.

Adjacent said gear 87 there is mounted on the fluted section 84 of the auxiliary shaft 82 a correspondingly fluted gear 89 that is provided on the face adjacent the gear 87 with lugs 91. The gear 89 is through the flutings tied for rotation to the auxiliary shaft 82, but is shiftable axially thereon for engaging, upon shifting in direction G, its lugs 91 with the apertures 88 of the gear 87 for coupling of the gears 87 and 89. The gear 89 is permanently in mesh with a gear 92 that is freely turnably and shiftably disposed on the main shaft 81. The gear 92 has a fluted hub 93 in correspondence with the fluted section 83 of the main shaft 81, and revolubly engages the surface of the main shaft 81 with the inner surfaces of its fluted hub 93, as best shown in Fig. 4. The fork 59 engages, in suitable annular grooves 94 and 96, simultaneously both said meshing gears 89 and 92, so that upon shifting of the fork 59 in directions H or G both gears 89 and 92 will simultaneously be shifted in said directions.

On the fluted section of the main shaft 81, there is shiftably positioned a gear 97 that is correspondingly fluted and through the flutings tied for rotation to the main shaft 81. This gear 97 is permanently in mesh with a gear 98 that is freely turnable and shiftable on the auxiliary shaft 82 and which has a fluted hub 99 in correspondence with the fluting of the fluted section 84. The fork 61, by means of grooves 101 and 102, engages both gears 97 and 98, so that upon shifting of the fork 61 in directions H or G the gears 97 and 98 will simultaneously be shifted correspondingly.

Adjacent the gear 97 there is mounted on the main shaft 81, freely turnably but not shiftably, a gear 103 that is in mesh with a gear 104 that is secured, for instance keyed, on the auxiliary shaft 82. The gear 103 has in the face opposite the gear 97 recesses 106 for engagement with corresponding lugs 107 that are formed on the gear 97. Upon movement of the gear 97 in the direction H, the lugs 107 will engage the recesses 106 of the gear 103. A sprocket gear 108 is keyed on the gear 103 for driving connection, for instance, by means of a chain (not shown), to the driving wheel of the motorcycle (not illustrated in the drawing).

The energy is thus imparted to the gearing from the engine to the shaft 81, and is discharged from the gearing by the sprocket gear 108. Between the points of entry and discharge of the energy, the gearing can be shifted between a neutral station of the gears shown in Fig. 2, and various, for instance four, speed stations, as will be explained below.

In all positions of the platen 44, the pins 57 and 58 are positioned in the stationary line X—X (Fig. 6), which is parallel to the axis of the stationary arbor 62. When the platen 44 is turned about the pivot 46, the pins 57 and 58 will be guided in direction towards and from the pivot 46 in directions H or G, each by one of the slots 54 and 56, but the movement of the pins 57 and 58 will always be in line with the line X—X.

In Fig. 6, the platen 44 has been shown in zero position, wherein the platen 44 is symmetrical about the line X—X, and in which all the gears are in neutral position or station (Fig. 2); the gears are shifted to low, second, third or high gear position by turning the platen 44. In the said zero position of the platen 44, the pins 57 and 58 are in position marked N—N in Fig. 6, and are disposed on the neutral-position radius "n" from the center pivot 46.

In Fig. 6 there have been marked indications for the four gear shift positions, the line I—I pertaining to the first or low speed gearing, the line II—II to the second speed, the line III—III to the third speed, and the line IV—IV to the fourth or high speed. Thus, for example, when the platen 44 is turned until the line I—I coincides with the line X—X, the first or low speed will have been shifted in; likewise, when the platen 44 has been turned until the line II—II coincides with the line X—X, the second speed will have been shifted in. The other speeds go on a similar principle.

Furthermore, there has been shown a line Y—Y which is disposed between the lines I—I and II—II. This line Y—Y indicates a zero position between the first and second speeds, in which, though the platen 44 is turned, the gears are in neutral station, as the pins 57 and 58 in Y—Y are on the radius "n."

Each of the slots 54 and 56 has sections at three different distances from the pivot 46. The slot 54 has an arcuate section 109 that extends from X—X to IV—IV (Fig. 6) and which is concentric with the periphery of the radius "n"; thus, turning of the platen 44 in direction F' will leave the pin 57 unmoved. The slot 54 between the positions X—X and II—II has an inclined section 111, the innermost point of which is concentric about a radius "r" that is smaller than the radius "n"; thus, by turning the platen 44 in direction E' until the line II—II coincides with the line X—X, the pin 57 will be shifted inwardly. The slot 54 furthermore has a bent section 112 between the lines II—II and I—I, which extends from a position of the pin 57 on the radius "r" to an end position wherein the pin 57 is stationed in the intersection of the slot with the line I—I on the radius "R." The radius "R" is larger than the radius "n," and the section 112 intersects at the line Y—Y a zero position for the pin 57 at the radius "n"; thus, by turning the platen 44 in direction E', from the previous position in which the line II—II coincided with the line X—X, until the line I—I will coincide with the line X—X, the pin 57 will be moved outwardly in direction G from its previous position on the radius "r" to a position on the radius "R," passing through a zero position when the line Y—Y temporarily coincides with the line X—X.

The slot 56 is arranged similarly to the slot 54, and has a section 209 on the radius "n," an inclined section 211 extending between the radii "n" and "r," and a bent section 212 between the radii "r" and "R."

OPERATION

The operation of the above described apparatus is as follows.

During normal gear shifting, the lever 14 and the shaft 13 are in the outer position shown in Fig. 2, wherein the key 18 engages the keyhole 23 of the actuating member 21, while the key 19 idles in the chamber 27 of the release member 22. In other words, during normal gear shifting, the lever 14 actuates the actuating driving member 21, while the release driving member 22 is at rest.

During this normal shifting, the gears are shifted by movement of the lever 14 between the positions O—B and O—A; during this normal shifting, the lever 14 engages the driving member 21 for actuating the gear shifting, by turning throughout the arc "b," or the arc "a" (Figs. 1 and 4). Following each such shift actuation, the lever 14 as well as the actuating driving member 21 are brought back to the initial horizontal position J—O, and this return movement is accomplished by means of the springs 37 and 38 acting on the pin 36 of the driving member 21.

Speed I

The first or low speed gear position is attained by moving the lever 14 upwards, in direction E from J—O to J—B (Fig. 4). By this movement, the latch 42 will engage a groove 49 to turn the platen 44 in direction E', until the line I—I coincides with the line X—X. In that latter position the fork 59 has been shifted in direction G to a position on the radius "R," while the fork 61 has remained at rest as the pin 58 thereof was guided in the arcuate slot section 209 which is peripheral of the radius "n."

In this low or first speed gear position, the fork 59 has pushed furthermost the gears 92 and 89 in the direction G, for connecting the lugs 91 of the gear 89 with the apertures 88 of the gear 87 to couple the gears 87 and 89. The torque transmission will thus be from the shaft 81 to the gear 86, thence to the gear 87 and the gear 89, transmitting the energy to the auxiliary shaft 82, and from there by means of the gear 104 to the gear 103 and to the sprocket gear 108.

Speed II

The second speed gear position is brought in by moving the lever 14 in direction F from J—O to J—A. By this movement, the latch 39 will engage a groove 48 to turn the platen 44 in direction F', until the line II—II coincides with the line X—X. By this movement, as best shown in Fig. 6, the fork 59 has been moved furthermost in direction H from its distance on the radius "R" to the new distance on the radius "r." The fork 61, however, still remains at rest. By this movement, the fork 59 has shifted the gears 92 and 89 in direction H, to disconnect the gear 89 from the gear 87 and to connect the fluted hub 93 of the gear 92 with the fluting 83 of the shaft 81. The torque transmission will be from the shaft 81 to the gear 89, thence to the auxiliary shaft 84, to the gear 104, the gear 103 and to the sprocket gear 108.

Speed III

In order to shift in the third speed gearing position, the lever 14 is moved in direction E from J—O to J—B. By this movement, the latch 39 will engage a groove 48 to turn the platen 44 in direction F' until the line III—III coincides with the line X—X. During this movement, the fork 59 will be moved in direction G from its location on the radius "r" to that on the radius "n," while the fork 61 will be moved oppositely, in direction H from a position on radius "n" to a position on radius "r." Thereby, the gears 92 and 89 will be returned by the fork 59 to the neutral station shown in Fig. 2, and the gears 97 and 98 will be moved in direction G furthermost by the fork 61 so that the fluted hub 99 of the gear 98 engages the fluting 84 of the auxiliary shaft 82.

In this third gear position or station the torque energy will be transmitted from the shaft 81 to the gear 97, the gear 98, thence to the auxiliary shaft 82 by the flutings 99 and 84, to the gear 104, the gear 103 and the sprocket gear 108.

Speed IV

In order to shift into the high or fourth speed gear position, the operator will turn the lever 14 in the direction F from J—O to J—A, thereby turning the platen 44 in direction F' by means of the latch 39 engaging a groove 48, until the line IV—IV coincides with the line X—X. This will leave the fork 59 unchanged, but will move the fork 61 in direction H from the radius "r" to the radius "R." By this movement, the fork 61 will push the gears 97 and 98 furthermost in the direction H, entering the lugs 107 of the gear 97 into the apertures 106 of the gear 103, to couple the gears 97 and 103. The torque will thus be transmitted from the main shaft 81 to the gear 97, thence to the gear 103 and to the sprocket gear 108.

Following completion of every and each shifting, the platen 44 will be held latched in the turned position by the latch mechanism 63, and the lever 14 and the actuating driving member 21 will be returned to the original or zero position shown in Fig. 4, by the spring 38, so that the lever 14 will again be in position J—O (Fig. 1).

On changing gradually from the fourth (high) speed to the first (low) speed, the lever 14 is always moved downwardly in direction F from J—O to J—A through the arc "a." During such movement, as evident from Fig. 6 (direction F'), the intervening gear speeds are shifted in successively in reverse order of numerical sequence until finally the first (low) speed gear position is reached. Conversely, as described in the foregoing, in shifting from the first (low) to the fourth (high) gear speed, the lever 14 will be moved downwardly in direction E from J—O to J—B through the arc "b," with the intervening gear speeds being shifted to, step-by-step, in numerical sequence. During the shifting intervals, the lever 14 will always be brought back to its original horizontal position at J—O.

By-pass to neutral

In order to shift from any gear speed, except from the first (low) speed, directly to the neutral station, without the lever 14 shifting in through its successive motions through the arcs "a" or "b" the intervening speed gear positions, the by-pass mechanism 69 may be used. In order to operate said by-pass mechanism 69, the operator will first push the lever 14 in direction H (Fig. 2) to the inner position (Fig. 3) against the resilient pressure of the spring 29, to bring into engagement the key 19 with the keyhole 26 of the release member 22. In this inner extreme position, the lever 14 is then turned by the operator upwardly in direction E through the arc "c" from J—O to J—C. As explained in the foregoing, between the various speeds the lever 14 is always returned to the horizontal position at J—O; in that position the lever 14 can then be pushed from the outer position to the inner position for subsequent turning through the arc "c." In the inner position, the key 18 idles in the chamber 24, and thus the actuating driving member 21 does not partake in the movement of the lever from J—O to J—C, but only the release member 22 takes part in the operation.

In moving the lever 14 through the arc "c," the latch 72 (Fig. 5) of the release member 22 partakes in this movement through the arc "c." During this movement, the latch 72 will be moved in direction E and will engage the long groove 47 to turn the platen 44 in direction E', and at the end of the movement the latch 72 will be retracted from the groove 47 by the engagement with the inclined surface 77 of the stationary member 78. At the termination of this movement, following turning of the latch 72 through the arc "c," the platen 44 will have been turned to a position in which the line Y—Y coincides with the line X—X. In this position the latch mechanism 63 will latch the platen 44. During this turning movement of the platen 44 in direction E' from either the second, third or fourth speeds (the first speed having been excepted), the forks 59 and 61 will be moved in direction H or G, owing to the guiding of the pins 57 and 58 in the grooves 54 and 56. However, wherever there occurs non-registry for engagement between the various gears, such as between the fluting 84 and the fluted hub 99, and the fluting 83 and the fluted hub 93, the respective fork will not follow the necessary shifting movement but will remain in position, and the link plates 51 and 52 will yield apart against the power of the springs 53 so that the forks 59 and 61 will finally be brought into the neutral position as determined by the coincidence of the line Y—Y with the line X—X, and the gears will be in neutral position as shown in Fig. 2.

As an example, let us consider the by-pass release in bringing the gearing to the neutral station (Fig. 2) from the fourth (high) gear speed. In the fourth gear speed, the platen 44 is turned in direction F' so that the line IV—IV coincides with the line X—X; the lever 14 and actuating device 21 have been returned to the zero position, with the lever 14 being disposed horizontally at J—O.

The operator will push in the lever 14 in direction H to provide for engagement between the lever 14 and the releasing member 22. Thereupon, the operator will turn the lever 14 through the arc "c" from J—O to J—C upwardly in direction F.

In the fourth speed, as previously mentioned, the pair of gears 97 and 98 is in the furthermost position in direction H, with the lugs 107 engaging the apertures 106, and the torque transmission being from the shaft 81 through the gear 97, gear 103 and sprocket gear 108.

As the lever 14 is turned through the arc "c," the latch 72 will engage the groove 47 turning the platen in direction E'. During the first portion of this turn, the fork 61 will be moved in direction G disengaging the lugs 107 from the apertures 106. During the remaining portion of the turning movement, the fork 61 will be urged in direction G to shift in the third speed, tending to engage the hub 99 on the fluted section 84 of the auxiliary shaft 82; this can only be accomplished if at that instant the flutings of the auxiliary shaft 82 and of the hub 99 are in registry. If there is no registery, the fork 61 will not follow the shifting movement, but instead will remain in its position and the plate 52 will yield. If, on the other hand, there is registry, the subsequent turning movement of the platen 44 in direction E' will return the fork 61 in direction H to the neutral position, with the pin 58 on the radius "n." During this subsequent turning movement, the pin 59 will be shifted in direction H, tending to engage the fluted hub 93 on the fluted section 83 of the main shaft 81. If there is no registry between the flutings, the second speed will not be shifted in, but instead the link plate 51 will yield and the fork 59 not follow the shifting movement but will remain in its position. If, on the other hand, there is registry between the flutings, the succeeding further turn in the direction E' will bring the fork 59 into neutral position, with the pin 57 on the radius "n."

Finally, when the line Y—Y coincides with the line X—X, the fork 61 as well as the fork 59 are in neutral station, their pins being on the radius "n," and the gearing being in neutral station.

In a similar manner, the second and third speeds can be shifted to the neutral station by means of the by-pass mechanism 69. As can be seen from Fig. 6, the second, third and fourth speeds are all on one side of the line Y—Y, with the arc "c" through which the latch 72 turns corresponding to the angle between the lines IV—IV and Y—Y.

In the case of the fourth speed, the latch 72 will engage the groove 47 throughout a major part of the swinging movement of the arm 71, whereas for the third and second speeds the engagement period between the latch 72 and the groove 47 will correspondingly be shorter.

In the foregoing, the first speed was stated to be the exception; it must be, as the first speed as indicated by the line I—I is on the other side of the line Y—Y and thus not subject to releasing by the release mechanism 70. However, for motorcycle driving, it is substantially of practical importance to return the gearing to neutral only from the higher speed positions and not from the low speed position.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. In a gear transmission, including driven means, driving means, and gearing therebetween shiftable among neutral and a plurality of speed stations, and means for shifting said gearing including a turnable actuator, in combination with, an actuating mechanism for said shifting means comprising a lever slidable in opposite directions along an axis between two extreme positions and turnable about said axis in either extreme position, drive means for engaging said actuator, said lever being operable, by turning in opposite directions in one extreme position to engage said drive means to turn said actuator, to shift said gearing among said stations in sequence, and actuable, by turning in one direction in the other extreme position, to engage said drive means for turning said actuator to restore said gearing from at least some of said speed stations to the neutral station by-passing said sequence.

2. In a gear transmission, including driven means, driving means and gearing therebetween shiftable among neutral and a plurality of speed stations, means for shifting said gearing, in combination with, a lever including a shaft reciprocably movable of the shaft axis between two extreme positions and turnable in each extreme position about the shaft axis, two independently movable elements tiltable about said axis for actuating said gear shifting means, and means intermediate said shaft and said elements for engaging said shaft with one element in one extreme position and with the other element in the other extreme shaft position, each element being operable to tilt about said axis upon engagement with said shaft when said lever is moved, one of said elements being operable to control said gear shifting among said stations, said second element being operable to restore said gearing to said neutral station from at least a majority of speed stations.

3. In a gear transmission, as claimed in claim 2, each element including an annular portion concentric with said axis and dimensioned to surround said shaft during shaft engagement, and having a groove, said shaft comprising two keys each fitting into a groove of an element, each element including an enlarged portion for key idling when said shaft is in an extreme position engaging the other element.

4. In a gear transmission, as claimed in claim 2, together with, said second element including a spring pressed latch for actuating said gear shifting means, and stationary means operable for retracting said latch to disengage the same from said gear shifting means upon a predetermined angular turn of said lever when said shaft engages said second element.

5. In a mechanism, for use in connection with a gear transmission having means for gear shifting between neutral and a plurality of speed stations including a turnable plate, a plate actuator, and a turnable lever for driving said actuator, in combination with, by-pass means operable for restoring said gearing to neutral station from at least some of said speed stations comprising a driving member actuable by said lever, means operable for disconnecting the driving connection between said lever and said actuator during engagement of said driving member, and a guide for said gear shift means movable on said plate and normally resiliently biased in guiding position and operable to be moved for temporary guiding suspension whereby said plate may be turned to a position of neutral gearing station during yielding of the resilient bias when said plate is operated by said driving member.

6. In a mechanism, as claimed in claim 5, together with, springs for resiliently biassing said guide and being so dimensioned that said yielding will take place only when shifting of said gearing is restrained by non-meshing gear positioning.

7. In a gear transmission, including driven means, driving means, and gearing therebetween shiftable among neutral and a plurality of speed stations, in combination with, gear shifting means comprising a turnable plate, cam means movably connected to said plate, gear shifting forks including cam followers engaging said cam means, and an actuating mechanism including an actuating driving member operable for turning said plate to operate said cams to guide said cam followers for gear shifting, a by-pass mechanism including a release driving member operable to engage said plate to turn the same and including springs normally keeping said cam means in a predetermined position, and yieldable upon turning of said plate by said release driving member, whereby said cams will slip against said cam followers, for restoring said gearing to said neutral station, and means operable to engage either driving member to the exclusion of the other.

8. In a gear transmission, including driven means, driving means, and gearing therebetween shiftable among neutral and a plurality of speed stations, in combination with, gear shifting means comprising a turnable plate, cam means connected to said plate, gear shifting forks including cam followers engaging said cam means, and an actuating mechanism including an actuating driving member operable for turning said plate to operate said cams to guide said cam followers for gear shifting, a by-pass mechanism including a release driving member operable to engage said plate to turn the same for restoring said gearing to said neutral station, and means operable to engage either driving member to the exclusion of the other, said cam means being movable on said plate and resiliently biased for normal immovability, said cams being movable upon blocking against shifting-in of gear speed incurred by said gearing for temporarily suspending the guiding by said cams of said followers, whereby said plate may be turned from positions corresponding to a majority of gear speed stations to a position wherein said gearing is at neutral station irrespective of whether intervening speeds are shifted-in or shifting blocked.

References Cited in the file of this patent

UNITED STATES PATENTS

| | | |
|---|---|---|
| 857,357 | Muller | June 18, 1907 |
| 1,687,721 | Glosh | Oct. 16, 1928 |
| 2,247,491 | Groene | July 1, 1941 |
| 2,591,268 | Le Blond | Apr. 1, 1952 |
| 2,630,718 | Dickas | Mar. 10, 1953 |